United States Patent
Jaaskelainen, Jr.

(10) Patent No.: US 6,564,374 B1
(45) Date of Patent: May 13, 2003

(54) METHOD AND APPARATUS FOR EMPLOYING COGNITIVE COMPARES IN COMPARE STATEMENT SEQUENCES

(75) Inventor: William Jaaskelainen, Jr., Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/296,873

(22) Filed: Apr. 22, 1999

(51) Int. Cl.[7] ................................................. G06F 9/45
(52) U.S. Cl. ........................ 717/159; 717/152; 717/153; 717/154
(58) Field of Search ............................. 717/9, 5, 4, 8, 717/140–159; 712/226–234

(56) References Cited

U.S. PATENT DOCUMENTS

| | | | |
|---|---|---|---|
| 5,202,975 A | | 4/1993 | Rasbold et al. ............. 395/500 |
| 5,313,634 A | | 5/1994 | Eickemeyer ................ 395/700 |
| 5,317,740 A | * | 5/1994 | Sites ........................... 395/700 |
| 5,450,585 A | * | 9/1995 | Johnson ...................... 717/150 |
| 5,530,964 A | * | 6/1996 | Alpert et al. ............... 717/151 |
| 6,145,120 A | * | 11/2000 | Highland .................... 717/106 |
| 6,260,191 B1 | * | 7/2001 | Santhanam ..................... 717/9 |

OTHER PUBLICATIONS

Alfred V. Aho Compilers Principles, Techniques and Tools © 1986 p., 535,558,559,592,593,596,597,598.*

* cited by examiner

*Primary Examiner*—Gregory Morse
*Assistant Examiner*—Chuck Kendall
(74) *Attorney, Agent, or Firm*—Duke W. Yee; David A. Mims, Jr.; Stephen R. Tkacs

(57) ABSTRACT

A compare sequence is executed at least once, and the results of that execution are used to modify the compare sequence for a subsequent execution of the compare sequence. In a preferred embodiment, the compare sequence is modified by placing the TRUE compare statement of the previous execution at the beginning of the compare sequence. In another preferred embodiment, the compare sequence is reordered in descending order of the number of TRUE compares associated with each compare statement. The compare sequence may be immediately modified after each successful compare, or the customer may define external sampling periods for modification of the compare sequences. The modification may be a single program modification of compare structures for delayed modification or a global modification of programs for delayed modification.

19 Claims, 10 Drawing Sheets

```
SCREEN   ONE

Select     Type of     Insurance Processing
```

|  | TYPE |
|---|---|
| Selected.   TRAVEL | AUTO |
|  | HOME |
|  | LIFE |
|  | PROPERTY |
| TODAY'S DATE: 2/28/99 | TRAVEL |
| USER: WENDY OF ACME TRAVEL | |

FIG. 1
(PRIOR ART)

```
IF INFIELD IS EQUAL TO 'AUTO' THEN LOAD 'AUTOMENU'
ELSE IF INFIELD IS EQUAL TO 'HOMEOWNER' THEN LOAD
     'HOMEMENU'
ELSE IF INFIELD IS EQUAL TO 'LIFE' THEN LOAD 'LIFEMENU'
ELSE IF INFIELD IS EQUAL TO 'PROPERTY' THEN LOAD
     'PROPMENU'
ELSE IF INFIELD IS EQUAL TO 'TRAVEL' THEN LOAD
     'TRAVELMENU'
ELSE
     MOVE 'ERROR' TO INFIELD
     RETURN
```

FIG. 2A
(PRIOR ART)

```
               CLC  INFIELD,'AUTO     '    CHECK FOR AUTO INSURANCE
               BNE  CONT1                  CHECK NEXT CONDITION IF FALSE
               LOAD, AUTOMENU              LOAD AUTOMOBILE MENU
               XCTL                        TRANSFER CONTROL TO NEW MENU
     CONT1     CLC  INFIELD,'HOMEOWNER '   CHECK FOR HOMEOWNER
               BNE  CONT2                  CHECK NEXT CONDITION IF FALSE
               LOAD, HOMEMENU              LOAD HOMEOWNER MENU
               XCTL                        TRANSFER CONTROL TO NEW MENU
     CONT2     CLC  INFIELD,'LIFE      '   CHECK FOR LIFE INSURANCE
               BNE  CONT3                  CHECK NEXT CONDITION IF FALSE
               LOAD, LIFEMENU              LOAD LIFE INSURANCE MENU
               XCTL                        TRANSFER CONTROL TO NEW MENU
     CONT3     CLC  INFIELD,'PROPERTY  '   CHECK FOR PROPERTY INSURANCE
               BNE  CONT4                  CHECK NEXT CONDITION IF FALSE
               LOAD, PROPMENU              LOAD PROPERTY INSURANCE MENU
               XCTL                        TRANSFER CONTROL TO NEW MENU
     CONT4     CLC  INFIELD,'TRAVEL    '   CHECK FOR TRAVEL INSURANCE
               BNE  CONT5                  DISPLAY ERROR MESSAGE IF FALSE
               LOAD, LIFEMENU              LOAD TRAVEL INSURANCE MENU
               XCTL                        TRANSFER CONTROL TO NEW MENU
     CONT5     MVC  INFIELD,'ERROR     '   REJECT INPUT ERROR MESSAGE
               RETURN                      RETURN TO MENU USER
```

*FIG. 2B*
(PRIOR ART)

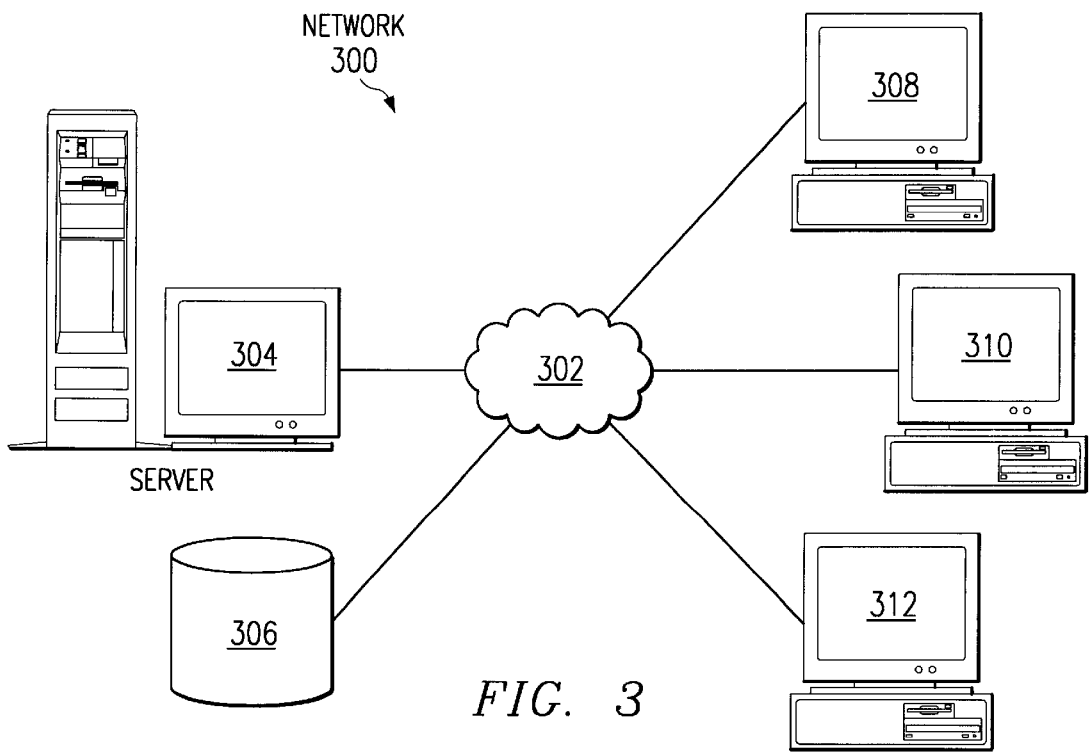

*FIG. 3*

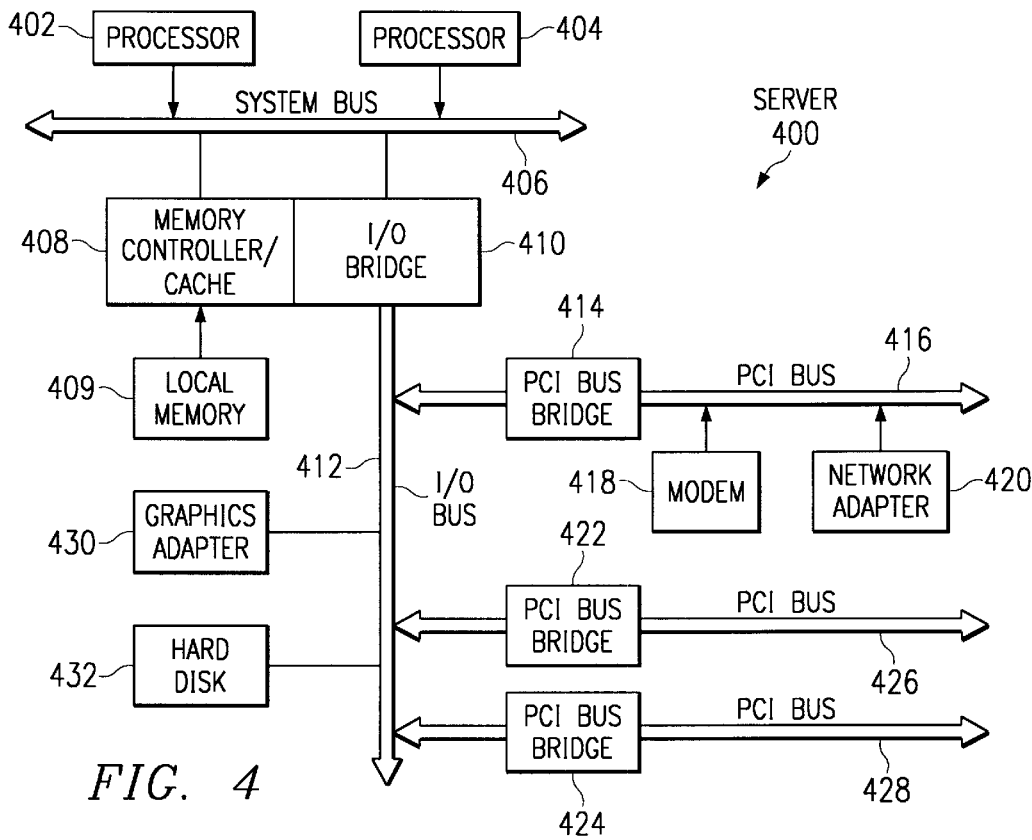

FIG. 4

```
           LA    REG4,0                        ZERO REGISTER FOUR
CONT1      CLC   ADDR(LEGALVAL(REG4))          CHECK ENTRY IN LEGAL
                                               VALUES FIELD

BE    CONT2                         PROCESS MATCH
           LA    REG4,LENGTH(COMPTAB(REG4))    INDEX TO NEXT ENTRY IF FALSE BY
                                               ADDING LENGTH OF ONE ENTRY IN
                                               COMPARISON TABLE

C     REG4,SIZE(COMPTAB)            CHECK FOR END OF TABLE BY
                                               COMPARING VALUE IN REG4 TO TOTAL
                                               LENGTH OF COMPARISON TABLE

BNH   CONT1                         BRANCH BACK TO REPEAT COMPARE IF
                                               NOT PAST LAST ENTRY

MVC   INFIELD,'ERROR                REJECT INPUT ERROR MESSAGE
           RETURN                              RETURN TO MENU USER

CONT2      LA    REG6,MENUFLD(REG4)            LOAD ADDRESS OF MENU NAME IN
                                               PARALLEL MENU NAME FIELD INTO
                                               REGISTER 6

LOAD,REG6                           LOAD MENU NAME POINTED TO BY
                                               REGISTER 6
           XCTL                                TRANSFER CONTROL TO NEW MENU
```

FIG. 9

| | | | |
|---|---|---|---|
| CONT | CLC INFIELD,NULLFIELD | | NULL CHECK TO RESERVE SPACE |
| CONTZ | BEQ | | NULL BRANCH TO BE FILLED IN LATER |
| CONT0 | CLC INFIELD,'AUTO | ' | CHECK FOR AUTO INSURANCE |
| | BNE CONT1 | | CHECK NEXT CONDITION IF FALSE |
| | MVC INFIELD,NULLFIELD | | SAVE CURRENT FIELD VALUE |
| | MVC CONTZ+2,ADDR(CONTA) | | MODIFY BRANCH ADDRESS |
| CONTA | LOAD, AUTOMENU | | LOAD AUTOMOBILE MENU |
| | XCTL | | TRANSFER CONTROL TO NEW MENU |
| CONT1 | CLC INFIELD,'HOMEOWNER | ' | CHECK FOR HOMEOWNER |
| | BNE CONT2 | | CHECK NEXT CONDITION IF FALSE |
| | MVC INFIELD,NULLFIELD | | SAVE CURRENT FIELD VALUE |
| | MVC CONTZ+2,ADDR(CONTB) | | MODIFY BRANCH ADDRESS |
| CONTB | LOAD, HOMEMENU | | LOAD HOMEOWNER MENU |
| | XCTL | | TRANSFER CONTROL TO NEW MENU |
| CONT2 | CLC INFIELD,'LIFE | ' | CHECK FOR LIFE INSURANCE |
| | BNE CONT3 | | CHECK NEXT CONDITION IF FALSE |
| | MVC INFIELD,NULLFIELD | | SAVE CURRENT FIELD VALUE |
| | MVC CONTZ+2,ADDR(CONTC) | | MODIFY BRANCH ADDRESS |
| CONTC | LOAD, LIFEMENU | | LOAD LIFE INSURANCE MENU |
| | XCTL | | TRANSFER CONTROL TO NEW MENU |
| CONT3 | CLC INFIELD,'PROPERTY | ' | CHECK FOR LIFE INSURANCE |
| | BNE CONT4 | | CHECK NEXT CONDITION IF FALSE |
| | MVC INFIELD,NULLFIELD | | SAVE CURRENT FIELD VALUE |
| | MVC CONTZ+2,ADDR(CONTD) | | MODIFY BRANCH ADDRESS |
| CONTD | LOAD, PROPMENU | | LOAD PROPERTY INSURANCE MENU |
| | XCTL | | TRANSFER CONTROL TO NEW MENU |
| CONT4 | CLC INFIELD,'TRAVEL | ' | CHECK FOR TRAVEL INSURANCE |
| | BNE CONT5 | | DISPLAY ERROR MESSAGE IF FALSE |
| | MVC INFIELD,NULLFIELD | | SAVE CURRENT FIELD VALUE |
| | MVC CONTZ+2,ADDR(CONTA) | | MODIFY BRANCH ADDRESS |
| CONTE | LOAD, LIFEMENU | | LOAD TRAVEL INSURANCE MENU |
| | XCTL | | TRANSFER CONTROL TO NEW MENU |
| CONT5 | MVC INFIELD,'ERROR | ' | REJECT INPUT ERROR MESSAGE |
| | RETURN | | RETURN TO MENU USER |

*FIG. 6*

COMPTAB TABLE

| LEGAL VALUES FIELD | MENU TO BE LOADED FIELD |
|---|---|
| AUTO | AUTOMENU |
| HOMEOWNER | HOMEMENU |
| LIFE | LIFEMENU |
| PROPERTY | PROPMENU |
| TRAVEL | TRAVMENU |

FIG. 8

COMPTAB TABLE

| LEGAL VALUES FIELD | MENU TO BE LOADED FIELD |
|---|---|
| (NULL ENTRY) | (NULL ENTRY) |
| AUTO | AUTOMENU |
| HOMEOWNER | HOMEMENU |
| LIFE | LIFEMENU |
| PROPERTY | PROPMENU |
| TRAVEL | TRAVMENU |

FIG. 10

```
        LA    REG4,0                              ZERO REGISTER FOUR
CONT1   CLC   INFIELD,ADDR(LEGALVAL(REG4))        CHECK ENTRY IN LEGAL VALUES FIELD
        BE    CONT2                               PROCESS MATCH
        LA    REG4,LENGTH(COMPTAB(REG4))          INDEX TO NEXT ENTRY IF FALSE BY
                                                  ADDING LENGTH OF ONE ENTRY IN
                                                  COMPARISON TABLE
        C     REG4,SIZE(COMPTAB)                  CHECK FOR END OF TABLE BY
                                                  COMPARING VALUE IN REG4 TO TOTAL
                                                  LENGTH OF COMPARISON TABLE
        BNH   CONT1                               BRANCH BACK TO REPEAT COMPARE IF
                                                  NOT PAST LAST ENTRY
        MVC   INFIELD,ERROR                       REJECT INPUT ERROR MESSAGE
        RETURN                                    RETURN TO MENU USER
CONT2   MVC   ADDR(COMPTAB),LENGTH(COMPTAB),
              ADDR(COMPTAB(REG4))                 SAVE MATCHING FIELD VALUES TO RESERVED
                                                  FIRST ENTRY IN COMPARISON TABLE
        LA    REG6,MENUFLD(REG4)                  LOAD ADDRESS OF MENU NAME IN PARALLEL
                                                  MENU NAME FIELD INTO REGISTER 6
        LOAD,REG6                                 LOAD MENU NAME POINTED TO BY REGISTER 6
        XCTL                                      TRANSFER CONTROL TO NEW MENU
```

FIG. 11

```
          LA   REG4,0                          ZERO REGISTER FOUR
          CLC  INFIELD,ADDR(LEGALVAL)          ASSUME FIRST ENTRY IN LEGAL VALUES
                                               FIELD IS MOST LIKELY MATCH
          BE   CONT3                           PROCESS MATCH
    CONT1 CLC  INFIELD,ADDR(INFIELD(REG4))     CHECK ENTRY IN LEGAL VALUES FIELD
          BE   CONT2                           PROCESS MATCH
          LA   REG4,LENGTH(COMPTAB(REG4))      INDEX TO NEXT ENTRY IF FALSE BY
                                               ADDING LENGTH OF ONE ENTRY IN LEGAL
                                               VALUE TABLE
          C    REG4,SIZE(COMPTAB)              CHECK FOR END OF TABLE BY
                                               COMPARING VALUE IN REG4 TO TOTAL
                                               LENGTH OF COMPARISON TABLE
          BNH  CONT1                           BRANCH BACK TO REPEAT COMPARE IF
                                               NOT PAST LAST ENTRY
          MVC  INFIELD,'ERROR                  REJECT INPUT ERROR MESSAGE
          RETURN                               RETURN TO MENU USER
    CONT2 MVC  ADDR(COMPTAB),LENGTH(COMPTAB),  SAVE MATCHING FIELD VALUES IN
          ADDR(COMPTAB(REG4))                  RESERVED FIRST ENTRY OF COMPARISON
                                               TABLE
    CONT3 LA   REG6,MENUFLD(REG4)              LOAD ADDRESS OF MENU NAME IN
                                               PARALLEL MENU TABLE INTO REGISTER 6
          LOAD,REG6                            LOAD MENU NAME POINTED TO BY
                                               REGISTER 6
          XCTL                                 TRANSFER CONTROL TO NEW MENU
```

*FIG. 12*

COMPTAB TABLE

| LEGAL VALUES FIELD | USECOUNT FIELD | MENU TO BE LOADED FIELD |
|---|---|---|
| AUTO | 4 | AUTOMENU |
| HOMEOWNER | 0 | HOMEMENU |
| LIFE | 31 | LIFEMENU |
| PROPERTY | 19 | PROPMENU |
| TRAVEL | 61 | TRAVMENU |

*FIG. 13A*

COMPTAB TABLE

| LEGAL VALUES FIELD | USECOUNT FIELD | MENU TO BE LOADED FIELD |
|---|---|---|
| TRAVEL | 61 | TRAVMENU |
| LIFE | 31 | LIFEMENU |
| PROPERTY | 19 | PROPMENU |
| AUTO | 4 | AUTOMENU |
| HOMEOWNER | 0 | HOMEMENU |

*FIG. 13B*

```
        LA    REG4,0                          ZERO REGISTER FOUR
CONT1   CLC   INFIELD,ADDR(LEGALVAL(REG4))    CHECK ENTRY IN LEGAL VALUES FIELD
        BE    CONT2                           PROCESS MATCH
        LA    REG4,LENGTH(COMPTAB(REG4))      INDEX TO NEXT ENTRY IF FALSE BY
                                              ADDING LENGTH OF ONE ENTRY IN
                                              COMPARISON TABLE
        C     REG4,SIZE(COMPTAB)              CHECK FOR END OF TABLE BY
                                              COMPARING VALUE IN REG4 TO TOTAL
                                              LENGTH OF COMPARISON TABLE
        BNH   CONT1                           BRANCH BACK TO REPEAT COMPARE IF
                                              NOT PAST LAST ENTRY
        MVC   INFIELD,'ERROR                  REJECT INPUT ERROR MESSAGE
        RETURN                                RETURN TO MENU USER
CONT2   CLC   GLOBALSWITCH,'ON'               TEST GLOBAL SWITCH FOR LOGGING ON
        BNE   NOLOG                           BYPASS IF LOGGING OFF
        ADDN,ADDR(USECOUNTFLD(REG4)),'1'      INCREMENT USE COUNT FOR MATCHING
                                              PARALLEL ENTRY IN LEGAL VALUE FIELD
NOLOG   LA    REG6,MENUFLD(REG4)              LOAD ADDRESS OF MENU NAME IN
                                              PARALLEL MENU TABLE INTO REGISTER 6
        LOAD,REG6                             LOAD MENU NAME POINTED TO BY
                                              REGISTER 6
        XCTL                                  TRANSFER CONTROL TO NEW MENU
```

*FIG. 14*

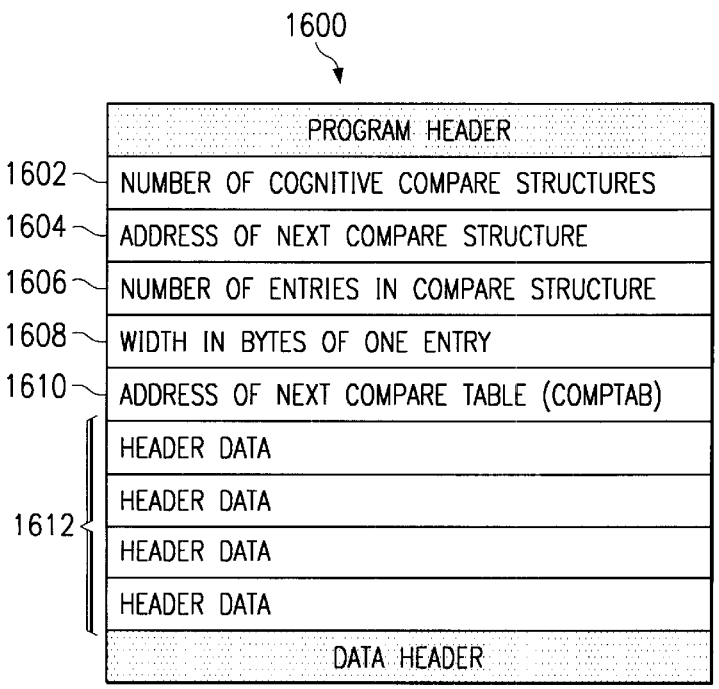

*FIG. 16*

METHOD AND APPARATUS FOR EMPLOYING COGNITIVE COMPARES IN COMPARE STATEMENT SEQUENCES

BACKGROUND OF THE INVENTION

1. Technical Field

This invention relates generally to processing data in a computer system. More particularly, the invention relates to optimizing code execution in a compare sequence. Still more particularly, the present invention relates to a means for reducing the number of instructions executed to find a successful compare in code sequence comprised compare statements.

2. Description of Related Art

In general, optimizing code in the past has consisted of compilers examining code that has been generated on a first pass and improving the generated assembler code by eliminating code which cannot be reached during execution, eliminating redundant register load instructions, consolidating like sequences of code, and generally fine-tuning the code-generated on the first pass. All of this code optimization takes place independently of the use that is made of the code when it is shipped to customers. The experienced practitioner would recognize that the process of application development goes through recognized phases, generally including code development, code test, code capture, and product shipment to customers. After an application is shipped, very little further optimization is possible, since compiler optimization options are decided in the code development phase. (One of ordinary skill in the art would also recognize that the phases of application development are the same whether employed by a recognized industry manufacturer or in-house by a customer who, in essence, is shipping the product to himself.) After the code is shipped, further optimization is very limited regardless of the differences among users of the code.

For example, consider the following users for an application shipped to two different customers for the same Insurance Application. FIG. 1 depicts a screen shot of a typical application menu as used for data entry into the application. Screen one of the application consists of a standard menu presenting the user with a requirement to select or enter the type of insurance, in this case for a claim. The choices presented to the customer in FIG. 1 are: Auto, Home, Life, Property, and Travel. Customer A, "Acme Travel," enters "Travel." Most modern menu driven applications would save "Travel" and provide a form of keystroke optimization filling in "Travel" for Customer A the next time screen one is displayed. Similarly, Customer B, "Precious Protection for Your Jewelry," enters "Property," so "Property" is filled in the next time Customer B causes screen one to be displayed.

FIG. 2A illustrate compiler level statements like COBOL which would process code to handle the input field for screen one in FIG. 1 Although both customers might be happy with the saved keystrokes on subsequent uses of the screen one menu, an examination in FIG. 2A of the assembler code generated by COBOL, C, or any other compiler underlying the identification of the Type of Insurance Claim, presents glaring inefficiencies.

FIG. 2B illustrates assembler language code created by processing the compiler level statements in FIG. 2A.

The creator of screen one for this insurance application had no knowledge of what type of insurance processing would be used by the purchaser. Likewise, the purchaser has no knowledge of the order in which the creator coded the compares in the compiler level language. Due to copyright and liability issues, application purchasers seldom have access to the source code for an application, and the compiler has no opportunity to optimize or tailor the generated assembler code to perform compares in the order best suited to each individual customer.

Therefore, in actuality, Customer A has purchased code which always executes four unnecessary compares before getting a TRUE condition on "Travel"; while Customer B has purchased code which always performs three unnecessary compares before getting a TRUE condition on "Property." It is TRUE that some customers "luck out," and their order of processing happens to match the order specified by the creator of the code.

This simplified example of five possible LEGAL VALUES on one screen menu is similar to compare code sequences permeating all software. It is a fairly safe assumption that an IF statement will generate a compare of two character strings 50 percent of the time, and that most compound IF statements or IF THEN ELSE statements will generate a list of compares. Since the IF statement is the foundation of software logic, these compares are by no means limited to code which supports screen menu input. Indeed, menus represent only the tip of the iceberg. Most business applications access lists of customers, accounts, part numbers, billing histories, and all the paraphernalia of the business world.

One of ordinary skill in the art would recognize that the compares cannot be avoided because the possibility of a changed input field, including a field in error, must be tested for on each and every transaction. Therefore, a need exists to provide a means of optimizing assembler code for individual users and customers by modifying code sequences based on actual customer usage.

In general, there is a need to optimize the code generated by nearly every compiler used by industry. For example, some compilers in both the C language and the COBOL language allow the user to specify a level of code optimization desired by the user. Almost all compiler providers recognize the need to allow the customer to optimize compilers for either optimal execution speed or minimal storage use. Although large scale applications and some systems programs provide a list of parameters which may generally affect storage and execution characteristics, these parameters are generally of a global nature, which are not effective at the individual code sequence level.

What is needed is a means for modifying individual code sequences in such a way as to optimize their execution by reducing the instructions needed for unnecessary compares.

SUMMARY OF THE INVENTION

The present invention discloses a method and apparatus for optimizing code execution by reducing the number of instructions executed to find a successful compare. A compare sequence is executed at least once, and the results of that execution are used to modify the compare sequence for a subsequent execution of the compare sequence. In a preferred embodiment, the compare sequence is modified by placing the TRUE compare statement, determined by the previous execution, at the beginning of the compare sequence. In another preferred embodiment, the compare sequence is re-ordered in descending order of the number of TRUE compares associated with each compare statement. The compare sequence may be immediately modified after each successful compare or the customer may define external sampling periods for modification of the compare sequences. The modification may be a single program modification of compare structures for delayed modification or a global modification of programs for delayed modification.

BRIEF DESCRIPTION OF THE DRAWINGS

The novel features believed characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a screen shot of a typical application menu as used for data entry into the application;

FIG. 2A illustrate compiler level statements like COBOL which would process code to handle the input field for screen one in FIG. 1;

FIG. 2B illustrates an assembler language code created by processing the compiler level statements in FIG. 2A.

FIG. 3 is a pictorial representation of a distributed data processing system in which the present invention may be implemented;

FIG. 4 is a block diagram of a data processing system which may be implemented as a server, such as server 304 in FIG. 3, in accordance with the present invention;

FIG. 6 illustrates an assembler code sequence depicting the most straightforward approach to comparing a single field to a list of values;

FIG. 8 depicts two parallel fields in a table that might be created for a preferred implementation for compare structures;

FIG. 9 depicts an assembler code for handling the Input field for screen one in FIG. 1, produced from a compiler level language like COBOL;

FIG. 10 depicts two fields that might be created for a preferred implementation for optimizing compare structures;

FIG. 11 illustrates an assembler code sequence created by the compiler in such a manner that after the reserved NULL entry has been set once, a false compare causes a complete reversion to the first compare state;

FIG. 12 illustrates an assembler code sequence that performs the same function as the code sequence in FIG. 11;

FIG. 13A depicts three fields, the two parallel fields from FIG. 10, plus a new parallel field for recording usage patterns;

FIG. 13B depicts three fields, after the table has been re-ordered in descending order in accordance with a preferred embodiment of the present invention;

FIG. 14 illustrates a code sequence that performs the compares required to process screen one, but which, instead of modifying code or tables, simply logs the frequency of the occurrence of TRUE compares for each legal value;

FIG. 16 depicts a program header containing compare statement sequence information which expedites the cognitive compare process in accordance with the present invention.

DETAILED DESCRIPTION OF THE PREFERRED EMBODIMENT

Figure 5:
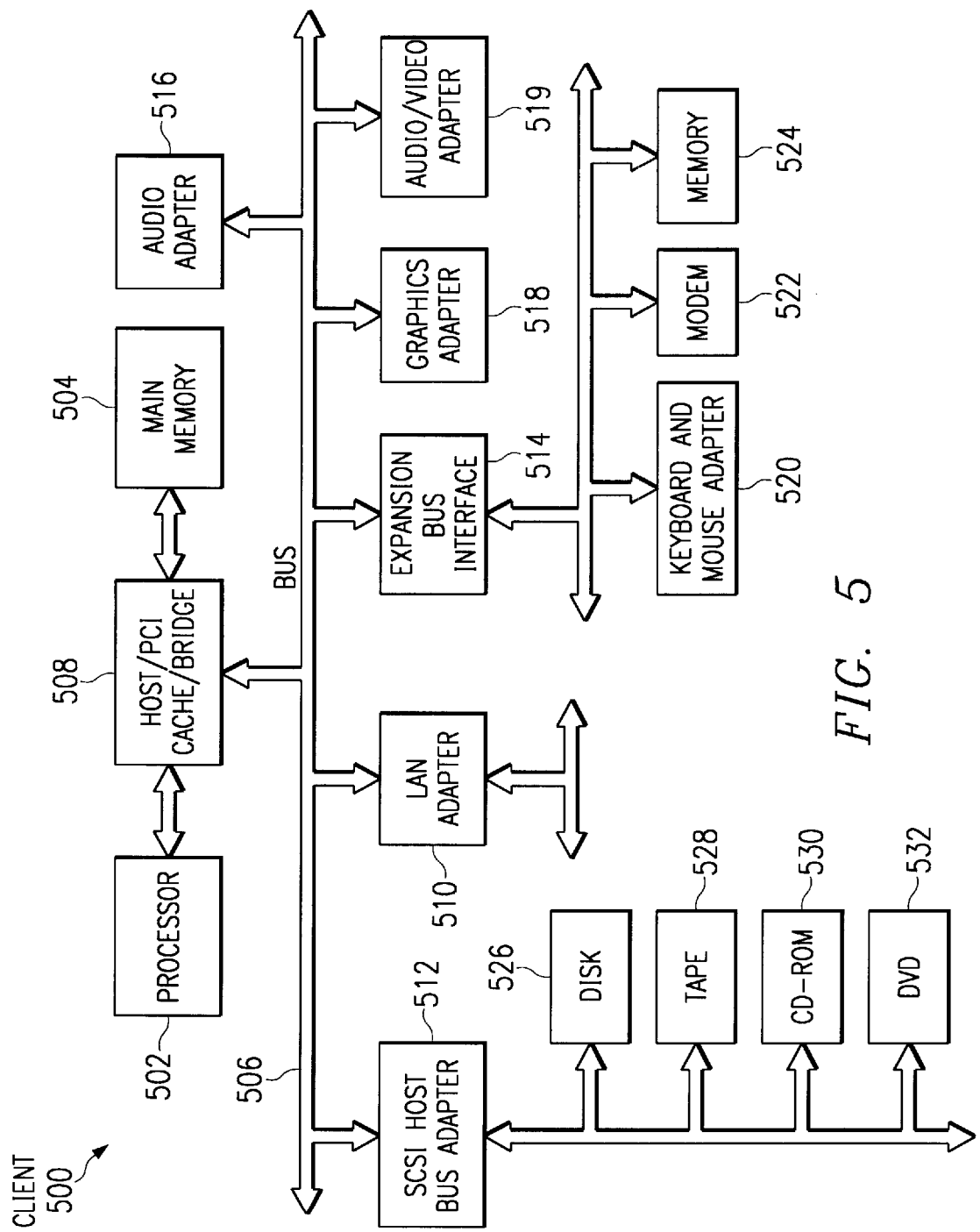
FIG. 5 depicts a block diagram of a data processing system in which the present invention may be implemented.

With reference now to the figures, and in particular with reference to FIG. 3, a pictorial representation of a distributed data processing system is depicted, in which the present invention may be implemented.

Distributed data processing system 300 is a network of computers in which the present invention may be implemented. Distributed data processing system 300 contains network 302, which is the medium used to provide communications links between various devices and computers connected within distributed data processing system 300. Network 302 may include permanent connections, such as wire or fiber optic cables, or temporary connections made through telephone connections.

In the depicted example, server 304 is connected to network 302, along with storage unit 306. In addition, clients 308, 310 and 312 are also connected to network 302. These clients, 308, 310 and 312, may be, for example, personal computers or network computers. For purposes of this application, a network computer is any computer coupled to a network that receives a program or other application from another computer coupled to the network. In the depicted example, server 304 provides data, such as boot files, operating system images and applications, to clients 308–312. Clients 308, 310 and 312 are clients to server 304. Distributed data processing system 300 may include additional servers, clients, and other devices not shown. Distributed data processing system 300 also includes printers 314, 316 and 318. A client, such as client 310, may print directly to printer 314. Clients such as client 308 and client 312 do not have directly attached printers. These clients may print to printer 316, which is attached to server 304, or to printer 318, which is a network printer that does not require connection to a computer for printing documents. Client 310, alternatively, may print to printer 316 or printer 318, depending on the printer type and the document requirements.

In the depicted example, distributed data processing system 300 is the Internet, with network 302 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 300 also may be implemented as a number of different types of networks such as, for example, an intranet or a local area network.

FIG. 3 is intended as an example and not as an architectural limitation for the processes of the present invention.

Referring to FIG. 4, a block diagram of a data processing system which may be implemented as a server, such as server 304 in FIG. 3, is depicted in accordance with the present invention. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409.

I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of modems 418–420 may be connected to PCI bus 416. Typical PCI bus implementations will support four PCI expansion slots or add-in connectors. Communications links to network computers 308–312 in FIG. 3 may be provided through modem 418 and network adapter 420 connected to PCI local bus 416 through add-in boards.

Additional PCI bus bridges 422 and 424 provide interfaces for additional PCI buses 426 and 428, from which additional modems or network adapters may be supported. In this manner, server 400 allows connections to multiple network computers. A memory mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 4 may be, for example, an IBM RISC/System 6000, a product of International Business Machines Corporation of Armonk, New York, running the Advanced Interactive Executive (AIX) operating system.

With reference now to FIG. 5, a block diagram of a data processing system in which the present invention may be implemented is illustrated. Data processing system 500 is an example of a client computer. Data processing system 500 employs a peripheral component interconnect (PCI) local bus architecture. Although the depicted example employs a PCI bus, other bus architectures, such as Micro Channel and ISA, may be used. Processor 502 and main memory 504 are connected to PCI local bus 506 through PCI bridge 508. PCI bridge 508 may also include an integrated memory controller and cache memory for processor 502. Additional connections to PCI local bus 506 may be made through direct component interconnection or through add-in boards. In the depicted example, local area network (LAN) adapter 510, SCSI host bus adapter 512, and expansion bus interface 514 are connected to PCI local bus 506 by direct component connection. In contrast, audio adapter 516, graphics adapter 518, and audio/video adapter (A/V) 519 are connected to PCI local bus 506 by add-in boards inserted into expansion slots. Expansion bus interface 514 provides a connection for a keyboard and mouse adapter 520, modem 522, and additional memory 524. In the depicted example, SCSI host bus adapter 512 provides a connection for hard disk drive 526, tape drive 528, CD-ROM drive 530, and digital video disc read only memory drive (DVD-ROM) 532. Typical PCI local bus implementations will support three or four PCI expansion slots or add-in connectors.

An operating system runs on processor 502 and is used to coordinate and provide control of various components within data processing system 500 in FIG. 5.

The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 500. Instructions for the operating system, the object-oriented operating system, and applications or programs are located on a storage device, such as hard disk drive 526, and may be loaded into main memory 504 for execution by processor 502.

Those of ordinary skill in the art will appreciate that the hardware in FIG. 5 may vary depending on the implementation. For example, other peripheral devices, such as optical disk drives and the like, may be used in addition to or in place of the hardware depicted in FIG. 5. The depicted example is not meant to imply architectural limitations with respect to the present invention. For example, the processes of the present invention may be applied to multiprocessor data processing systems.

The present invention discloses a variety of techniques for modifying the assembler code based on usage. A compare sequence is executed at least once, and the results of that execution are used to modify the compare sequence for a subsequent execution of the compare sequence. In one preferred embodiment, the compare sequence may be modified by placing the TRUE compare statement of the previous execution at the beginning of the compare sequence. In another preferred embodiment, the compare sequence is re-ordered in descending order of the number of TRUE compares associated with each compare statement. In another preferred embodiment, data declarations used to drive assembler code sequences are re-ordered in descending order of the number of TRUE compares associated with each compare statement. The compare sequence or data declaration may be immediately modified after each successful compare or the customer may define external sampling periods for modification of the compare sequences. The modification may be a single program modification of compare structures for delayed modification or a global modification of programs for delayed modification.

Optimization techniques offer a range of options, including: immediate modification of compare sequences after each successful compare; customer defined external sampling periods followed by modification of compare sequences; immediate or delayed modification of assembler code sequences; immediate or delayed modification of data declarations used to drive assembler code sequences; single program modification of compare structures for delayed modification; and global modification of programs for delayed modification.

The depicted techniques are user specific, and each technique is not suitable for every user. For example, in systems where each user has a copy of the program resident on the computer on which the program is running, immediate modification works well. However, in systems where a single copy of code exists and all users share memory, a single copy of the application, immediate modification made to the single copy will cause users to interfere with each other's processing.

Immediate modification can only be used successfully where each user has or creates an individual copy of a program and the program exists on each individual CPU. Similarly, delayed modification cannot be indiscriminately applied to systems where only one copy of the program exists and this single copy is loaded without modification by all users, unless most users perform almost exactly the same task most of the time. Since these questions are related to packaging, distribution and systems management of the code, they are beyond the scope of this invention. Nonetheless, users must be aware of the ramifications and possibilities of tailoring the types of modification to a particular system environment.

FIG. 6 illustrates an assembler code sequence depicting the most straightforward approach to comparing a single filed to a list of values. In examining a single statement, such as "CLC INFIELD, 'AUTO . . . '", one of ordinary skill in the art would recognize that the compare will be between two storage locations—one determined by the storage location initially assigned to the symbolic name "INFIELD", and one determined by the storage location assigned to the literal value 'AUTO . . . ' These storage locations are known and can be referenced symbolically by the compiler, and are resolved to actual, absolute or relative addresses (to load point in storage) by the assembler. Since the compiler can reference the location of any storage location it creates, the simplest (and least sophisticated) method of code modification is possible, as follows:

1) The compiler creates a NULL compare as the first compare in a list.
2) The compiler creates an extra move that takes place whenever a successful compare occurs.

This move supplants the NULL compare, so the next compare is made to the most recent previous value compared. It should be obvious that in compare sequences where the same field is compared repetitively, the TRUE compare will be found first. Admittedly, this technique, which is depicted in FIG. 6, creates an excessive number of extra instructions, but it does in fact work.

The assembler code sequence shown in FIG. 6 is created by the compiler in such a manner that after NULLFIELD has been set once, a false compare causes a complete reversion to the first compare state; that is, all five values are tested, and a TRUE compare causes NULLFIELD to be set to the value which caused the TRUE compare. However, once NULLFIELD has been set once, and a TRUE compare is found on the first compare (at label 'CONT'), a branch is immediately made to the correct menu load statement. This will benefit all five types of insurance users; provided they are repetitively entering the same value for 'INFIELD', no more than four assembler language instructions will be executed to load the next menu.

Figure 7:
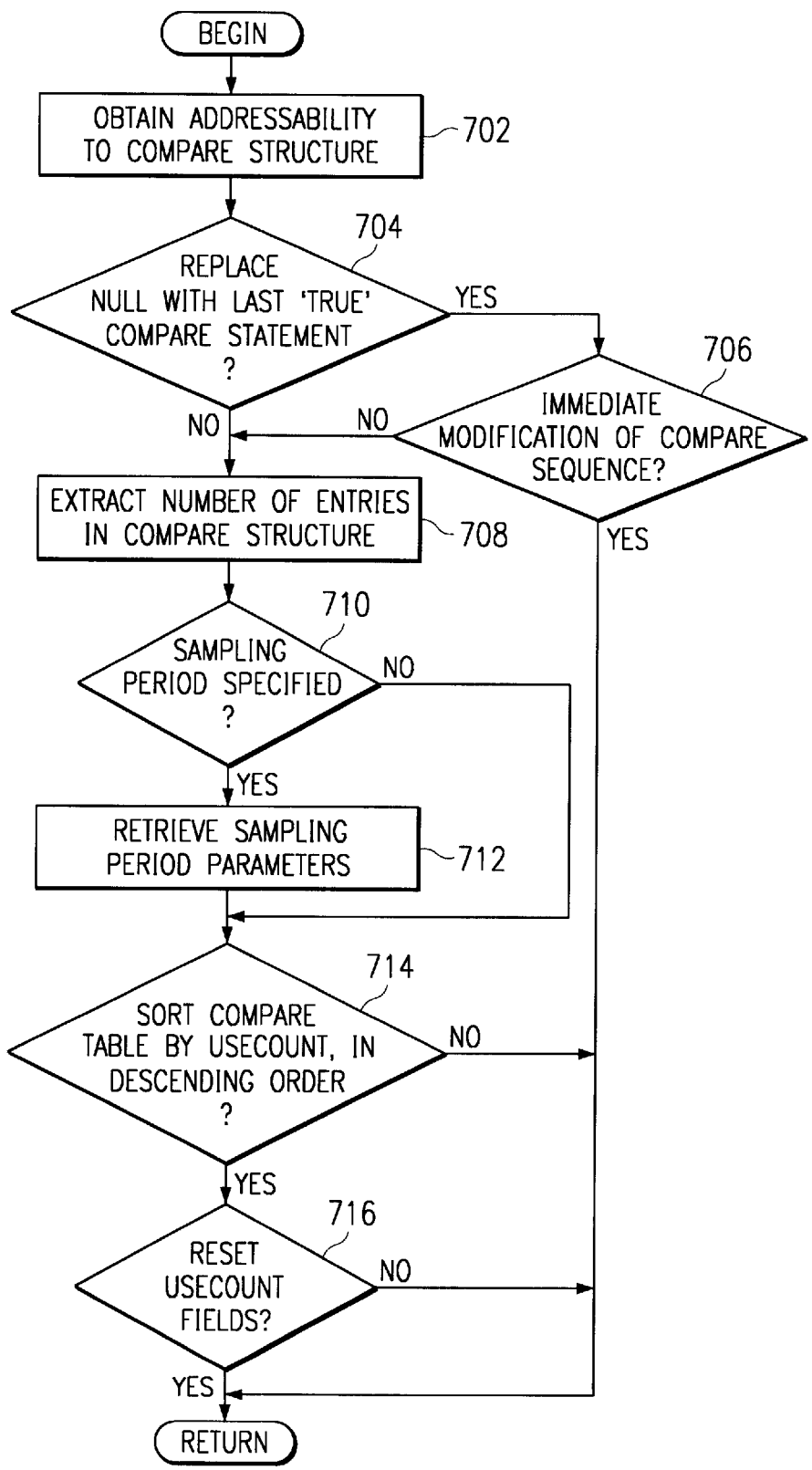
FIG. 7 depicts a process for modifying a compare sequence as disclosed by a preferred embodiment of the present invention.

FIG. 7 illustrates the process for modifying a compare sequence as disclosed by a preferred embodiment of the present invention. The depicted process may be performed either immediately upon invocation of a compare or be deferred and performed as a routine for modifying a group of compare structures in a program directory or library. The process begins by obtaining addressability to a compare structure (step 702). The addressability of a compare structure may be indexed in a program header and read directly from the header for the address of the compare structure within the program. Next, a determination is made whether to replace a NULL statement with the last TRUE compare statement (step 704). In accordance with a preferred embodiment of the present invention, executing the compare structure may commence with a NULLFIELD compare. NULLFIELD compare is especially helpful for an immediate modification of a compare sequence, as a subsequent invocation of the compare sequence would commence with the last TRUE compare statement. Therefore, given the peculiarities of data entry and the likelihood that a subsequent field entry will be identical to the present field entry, substituting the last TRUE compare statement with a NULL entry commences the compare sequence with the compare statement to be TRUE in the sequence. If it is decided to replace NULLFIELD with the last TRUE compare statement, then it is assumed that the modification of the compare sequence is being done immediately after the last compare period. Generally, it is assumed that re-sorting the compare sequence each time after execution would cost more execution time than would be saved by reordering the compare sequence. Therefore, the most likely flow of an immediate modification technique would be to only replace the NULL field with the last TRUE compare, and not to sort the compare sequence.

However, cases may exist in which the modification may not be performed at the time of the compare. Therefore, a determination is made as to whether the modification is an immediate modification of the compare sequence (step 706). If the modification is an immediate modification, the process advances to RETURN and does not modify the compare sequence further. If, in the unlikely event replacing NULL with the last TRUE compare statement is not an immediate modification, the process flows to step 708.

The exact number of entries in a compare structure is ascertained from the structure header at step 708. The number of entries in a compare structure is needed for sorting the compares. When the number of entries in the compare structure has been read from the structure header, the sampling period must be determined (step 710).

Generally, the sampling period is not considered because the entire structure is sorted by the entries in the USECOUNT field of each compare statement. However, cases may exist in which the entire period from the last sorting is either unnecessary or invalid for the present sorting. Therefore, the user may specify a sampling period to more accurately reflect the new compare sequence order. If it is decided to use a sample period for sorting the compare statements, then the sample period parameters are retrieved (step 712). Using only the USECOUNT associated with the sample period, the compare table is sorted in descending order (step 714).

Returning to step 710, if no sampling period is specified, the process flows to step 714, where it must be determined whether or not to reset the USECOUNT fields. The compare table is then sorted by the USECOUNT available in the compare table. The compare table is sorted in descending order.

If, the sorting is performed on the basis of a sampling period, USECOUNT fields may not be reset (step 716). Alternatively, and most likely, the USECOUNT field will be reset each time the compare sequence is sorted and reordered (step 716). The process then flows to RETURN.

Obviously, the process depicted in FIG. 7 illustrates a more sophisticated approach than merely performing straight line comparisons of all possible values, as illustrated in FIG. 6.

An alternative preferred embodiment of the present invention is for the compiler to create tables which parallel the conditions specified in the high level language, such as COBOL or C. FIG. 8 depicts two parallel fields in a table that might be created for a preferred implementation for compare structures. While two parallel fields in the same table are shown, the same results could be achieved with two parallel tables.

FIG. 9 depicts assembler code to handle the Input field for screen one in FIG. 1, produced from a compiler level language like COBOL. FIG. 9 further depicts an assembler code needed to access the fields in the table illustrated in FIG. 8 and to support the same logic expressed in the high level language shown in FIG. 5. In this more sophisticated approach, far fewer inline instructions are needed to achieve the same goal, even though more instructions are actually executed, due to the fact table processing needs extra instructions to load the address of the fields containing the legal value and the menu-to-be-loaded.

FIG. 10 depicts two fields that might be created for a preferred implementation for optimizing compare structures. In this case, NULL entries are reserved in the table instead of in the code, as shown in FIG. 6.

FIG. 10 depicts the assembler code needed to access the fields and support the logic expressed in a high level language shown in FIGS. 2A and 2B. This method of modifying table data would be preferred by manufacturers who wish to avoid modifying code due to specific architectural constraints or self-imposed policy constraints, and will also be preferred by manufactures who wish to minimize the amount of assembler code generated for a program.

The assembler code sequence shown in FIG. 11; is created by the compiler in such a manner that, after the reserved NULL entry has been set once, a false compare causes a complete reversion to the original compare techniques of checking for all five legal values in sequence. When all five values are tested, a TRUE compare causes the reserved NULL entry to be set to the value that caused the TRUE compare. However, once the reserved NULL entry has been set, and a TRUE compare is found on the first compare (at label 'CONT1'), a branch is immediately made to the correct menu load statement.

This benefits all five types of insurance users, provided they are repetitively entering the same value for 'INFIELD,' since no more than seven assembler language instructions will be executed to load the next menu. If an assumption is made that repetitive processing will occur, two instructions can be added to further reduce the number of instructions, as demonstrated in FIG. 12.

The assembler code sequence shown in FIG. 12 performs the same function as the code sequence in FIG. 11. Although two extra instructions are generated, after the NULL entry has been set for repetitive compares, a TRUE compare causes only six assembler instructions to be executed.

As stated previously, immediate modification of code or table values may not be suitable for all users. Modifications which involve replacing the NULL entry with the last TRUE compare can be performed immediately or delayed. However, sorting table fields are generally deferred because sorting after each successful compare would take more time than would be realized by reordering the compare statements in the compare sequence. So instead of immediate modification, it is possible to delay modification and then perform the modifications based on a user or program determined sampling period.

FIG. 13A depicts three fields—the two parallel fields from FIG. 10, plus a new parallel field for recording usage patterns. Although shown as an internal table, this data could also be logged in a file and recorded on an external media, such as diskette, disk, tape, etc.

FIG. 13B depicts the table including the three fields illustrated in FIG. 13A after the COMPTAB has been reordered in descending order of the logged value placed in the USETABLE field in accordance with a 5 preferred embodiment of the present invention.

The code sequence in FIG. 14 performs the compares required to process screen one, but instead of modifying code or tables, it simply logs the frequency of the occurrence of TRUE compares for each LEGAL VALUE. Note the USECOUNT values logged for each LEGAL VALUE where the LEGAL VALUE is determined to be TRUE.

Figure 15:
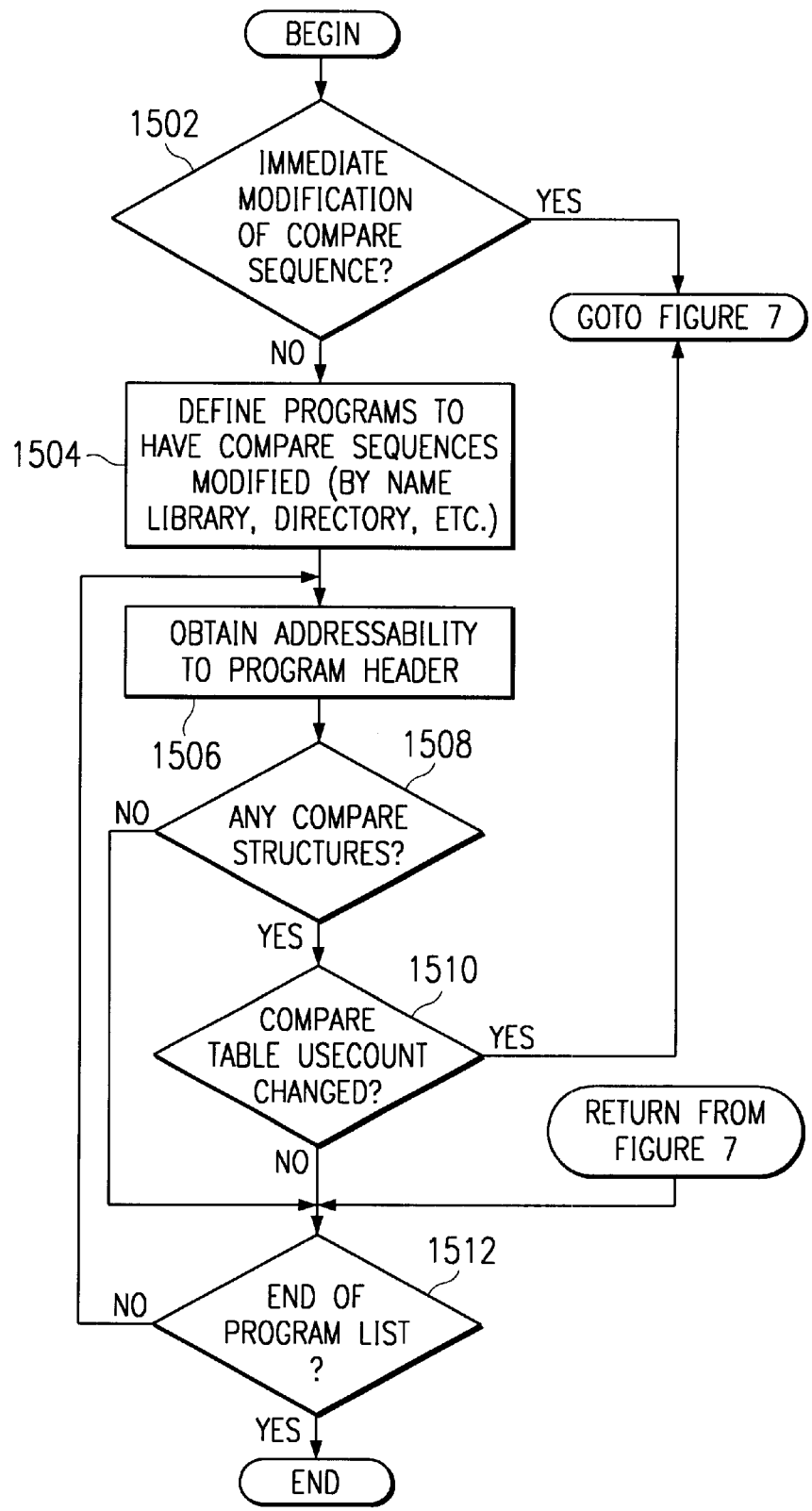
FIG. 15 illustrates a method for invoking the process depicted in FIG. 7 based on whether the modification is immediate or delayed, and based on the identity of the application.

FIG. 15 illustrates a method for invoking the process depicted in FIG. 7 based on whether the modification is immediate or delayed, and based on the identity of the application, as depicted in a preferred embodiment of the present invention. The method begins by determining whether the modification to the compare sequence is an immediate modification (step 1502). If it is an immediate modification, the method flows directly to the method of FIG. 7. If it is not an immediate modification, the programs which have compare sequences to be modified must be defined (step 1504). The program or application may be defined by its name, or a group of programs may be defined by their library or directory. After a program has been defined, the method obtains addressability to the program header (step 1506). The program header contains useful information, such as the number of cognitive compare structures within the program, the address of the next compare structure, the number of entries in that structure, and an indication of whether or not that structure has been used since the last modification.

Next, a determination is made as to whether or not any compare structures are present in the application (step 1508). If compare structures are present in the application, it is then determined whether the compare table USECOUNT has changed (step 1510). An indication of whether the USECOUNT of a particular compare structure has changed or not may be found in the program header. If the USECOUNT has changed since the last modification, the method flows to the process in FIG. 7.

Returning to step 1508, if no compare structures are identified within the program, a determination is made whether or not another program exists within the programs defined at step 1504. Similarly, returning to step 1510, if the USECOUNT located in the compare table of the compare structures identified in the program has not changed, the method flows to step 1512. If no additional programs are defined in the list, the method flows to step 1506, and the addressability of that program header is obtained.

Alternatively, upon completion of the process depicted in FIG. 7, or modification of the compare sequences identified at step 1510, the method of FIG. 15 flows to step 1512, where it is determined whether the method has reached the end of the program list defined in step 1504. If the method has been performed on the last program in the list, the method ends.

The assembler code sequence shown in FIG. 14 performs the same function as the code sequences in FIG. 9. In addition, the frequency of successful matches is logged in the USECOUNT field, provided a global switch has been turned on. This logging could also be done continuously, or turned on and off by an internal program setting, such as an interval based on the system clock. A sample could thus be created at almost any regular or adhoc interval desired by the user. The logging could also be done unconditionally without global switch setting or testing.

After an interval has passed, the method of table modification is simple. The three fields shown in FIG. 13 are sorted in parallel, using USECOUNT as the key. This technique places the most frequently found value first in the LEGAL VALUES field(s), the second most frequently found value second in the LEGAL VALUES field(s), and so on. Ordering all of the values might be regarded as the optimum solution, but in a very repetitive compare structure, perhaps only the first entry would have to be correct to significantly reduce compares. Other numerical analyses might be performed as well.

For example, if all entries in the USECOUNT field of the COMPTAB table are roughly equivalent, there is no need to perform a sort or to modify the tables in any way. The lack of a pattern uncovered by the sampling interval can be valuable information in itself. Likewise, if the USECOUNT for all entries is zero, then the code has not been exercised and there is no need for modification.

All of the above discussion involves only one compare structure. As stated previously, compare structures are very prevalent in computer code, as they support many if not most "IF" and "IF THEN ELSE" structures. There are at least two possible methodologies: inline code packaged with each program which has cognitive compare structures, or an offline program specifically designed to examine and modify other programs which have cognitive compare structures.

The option of processing via inline code is shown in the flowchart of FIG. 7, "Single Program Compare Modifications". The option of processing one or more programs is shown in the flowchart in FIG. 15, "Global Compare Modifications".

As is well known in the art, all executable programs, whether referred to as "object modules" or "load modules" or "executables" or "exe" objects, have a header which provides technical information about the program, such as total size of the program, beginning of constants defined within the program, references to objects external to the program, size of the work area contained within the program, and so on. This information would be enhanced in a module containing cognitive compares by adding a list of the start and stop addresses of all cognitive compare structures contained in the program.

FIG. 16 depicts a program header containing compare statement sequence information that expedites the cognitive compare process in accordance with the present invention. This list would be accessed during "Single Program Compare Modifications" to find and modify table data, and would also be accessed during "Global Compare Modifications" to recognize when a program contains one or more cognitive compare structures.

Header fields depicted in program header 1600 include a field for the Number of Cognitive Compare Structures field 1602. By knowing the initial number of cognitive compare structures in a particular program, the modification process depicted in FIG. 15 moves from one compare structure, found at a specific address stored in Address of Next Compare Structure field 1604, to the next compare structure, until the total number of structures in the application have been exhausted.

Importantly, in another preferred embodiment of the present invention, the compare structure rather than the compare table might be re-ordered. Thus, the compare structure may be written to a memory location external to the program and held in Address of Next Compare Structure field 1604.

Sorting the parallel fields in the compare table requires knowing the number of compare statement in the compare structure (Number of Entries in Compare Structure 1606) and the width of the entry field in the compare structure (Width in Bytes of One Entry 1608), even though the address of the COMPTAB table may be deduced from the compare structure at line:

CONT2 MVC ADDR(COMPTAB), LENGTH (COMPTAB), ADDR(COMPTAB(REG4) The address of the next compare table is listed at entry Address of Next Compare Table (COMPTAB) 1610. Finally, technical information about the program is listed in Header Data entries 1612.

It is important to note that, while the present invention is described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such as a floppy disc, a hard disk drive, a RAM, a CD-ROM, and transmission-type media such as digital and analog communications links.

The above description of the present invention is presented for purposes of illustration and description but is not intended to be exhaustive or limited to the invention in the form disclosed. Many modifications and variations will be apparent to those of ordinary skill in the art. The embodiments were chosen and described in order to best explain the principles of the invention and the practical application, and to enable others of ordinary skill in the art to understand the invention for various embodiments with various modifications as are suited to the particular uses contemplated.

What is claimed is:

1. A data processing implemented method for optimizing execution of compare statements comprising:

executing compare statements in a compare sequence;

finding a successfully executed compare statement;

updating the compare sequence to reflect finding the successfully executed compare statement, wherein the compare sequence is updated to form an updated compare sequence;

storing the updated compare sequence; and executing the updated compare sequence, wherein the step of updating further comprises:

retrieving a compare table, wherein the compare table includes a compare statement field which identifies each compare statement in the compare sequence and an aggregate success field which lists an aggregate number of successful executions of each compare statement identified in the compare statement field; and increasing the aggregate success field for each successful execution of a compare statement identified in a compare statement field.

2. The data processing implemented method recited in claim 1, wherein the step of updating further comprises:

reordering the compare table, wherein the order of compare statement fields is based on the aggregate success field.

3. A data processing implemented method for optimizing execution of compare statements comprising:

accessing a set of success indicators, wherein a success indicator reflects a number of successful executions of a compare statement, and wherein the set of success indicators reflects a number of successful executions of a set of compare statements, and wherein a set of compare statements forms a compare structure; and on the basis of accessing the set of success indicators:

extracting a success indicator from the set of success indicators;

comparing the extracted success indicator with remaining success indicators from the set of success indicators; and on the basis of comparing the extracted success indicator, prioritizing execution of the set of compare statements within the compare structure.

4. The data processing implemented method for optimizing execution of compare statements recited in claim 3, wherein the step of comparing is performed at a prescribed time.

5. The data processing implemented method for optimizing execution of compare statements recited in claim 3, wherein the step of comparing is performed immediately after executing at least one of the set of compare statements.

6. The data processing implemented method for optimizing execution of compare statements recited in claim 3, wherein the step of accessing is performed for each compare structure contained in an application.

7. The data processing implemented method for optimizing execution of compare statements recited in claim 6, wherein the compare structure is a first compare structure, the step of accessing further comprises:

determining if none of the compare statements in the first compare structure had been successfully executed; and on the basis of none of the compare statements in the first compare structure being successfully executed, accessing a set of success indicators associated with each of a set of compare statements in a second compare structure in the application.

8. The data processing implemented method for optimizing execution of compare statements recited in claim 6, wherein the compare structure is a first compare structure, the step of accessing further comprises:

determining if none of the compare statements in the first compare structure had been successfully executed during a sampling period; and on the basis of none of the compare statements in the first compare structure being successfully executed during the sampling period, accessing a set of success indicators associated with each of a set of compare statements in a second compare structure in the application.

9. The data processing implemented method for optimizing execution of compare statements recited in claim 3, wherein information related to the compare structure is available in a file header.

10. The data processing implemented method for optimizing execution of compare statements recited in claim 3 further comprising:

executing the set of compare statements on the basis of execution priority; and logging a successful execution of a compare statement in a success indicator, wherein the success indicator reflects a total number of successful executions of the compare statement.

11. A data processing system for optimizing execution of compare statements comprising:

executing means for executing compare statements in a compare sequence;

finding means for finding a successfully executed compare statement;

updating means for updating the compare sequence to reflect finding the successfully executed compare statement, wherein the compare sequence is updated to form an updated compare sequence;

storing means for storing the updated compare sequence; and executing means for executing the updated compare sequence, wherein the updating means for updating further comprises:

maintaining means for maintaining a success aggregate of successful executions for each compare statement in the compare sequence, wherein the success aggregate reflects a total number of successful executions of a compare statement; and increasing means for increasing the success aggregate for the successful execution of a compare statement.

12. A data processing system for optimizing execution of compare statements comprising:

executing means for executing compare statements in a compare sequence;

finding means for finding a successfully executed compare statement;

updating means for updating the compare sequence to reflect finding the successfully executed compare statement, wherein the compare sequence is updated to form an updated compare sequence;

storing means for storing the updated compare sequence; and executing means for executing the updated compare sequence, wherein the updating means for updating further comprises:

retrieving means for retrieving a compare table, wherein the compare table includes a compare statement field which identifies each compare statement in the compare sequence and an aggregate success field which lists an aggregate number of successful executions of each compare statement identified in the compare statement field; and increasing means for increasing the aggregate success field for each successful execution of a compare statement identified in a compare statement field.

13. The data processing system recited in claim 12, wherein the updating means for updating further comprises:

reordering means for reordering the compare table, wherein the order of compare statement fields is based on the aggregate success field.

14. A data processing system for optimizing execution of compare statements comprising:

accessing means for accessing a set of success indicators, wherein a success indicator reflects a number of successful executions of a compare statement, and wherein the set of success indicators reflects a number of successful executions of a set of compare statements, and wherein a set of compare statements forms a compare structure;

extracting means for extracting a success indicator from the set of success indicators on the basis of accessing the set of success indicators;

comparing means for comparing the extracted success indicator with remaining success indicators from the set of success indicators; and prioritizing means for prioritizing execution of the set of compare statements within the compare structure on the basis of comparing the extracted success indicator.

15. The data processing system for optimizing execution of compare statements recited in claim 14, wherein the comparing means for comparing performs at a prescribed time.

16. The data processing system for optimizing execution of compare statements recited in claim 14, wherein the comparing means for comparing is performed immediately after executing at least one of the set of compare statements.

17. The data processing system for optimizing execution of compare statements recited in claim 14, wherein the accessing means for accessing accesses each compare structure contained in an application.

18. A computer program product for implementing a method for optimizing execution of compare statements in a data processing system, the computer program product being embodied on a computer readable medium and comprised of instructions, the instructions comprising:

accessing instructions for accessing a set of success indicators, wherein a success indicator reflects a number of successful executions of a compare statement, and wherein the set of success indicators reflects a number of successful executions of a set of compare statements, and wherein a set of compare statements forms a compare structure;

extracting instructions for extracting a success indicator from the set of success indicators on the basis of accessing the set of success indicators;

comparing instructions for comparing the extracted success indicator with remaining success indicators from the set of success indicators; and prioritizing instructions for prioritizing execution of the set of compare statements within the compare structure on the basis of comparing the extracted success indicator.

19. A data structure for optimizing execution of compare statements in a data processing system, the data structure being embodied on a computer readable medium and comprised of functional data, the functional data comprising:

a compare table for listing functional data for defining an execution sequence of a plurality of compare statements in a compare sequence, the table comprising:

a compare statement field for identifying compare statements in the compare sequence; and a compare statement success field associated with each compare statement field for declaring an updateable number of successful executions of the associated compare statement, wherein the compare statement success field defines an execution sequence for executing at least one of the compare statements.

* * * * *